US012781445B2

(12) United States Patent
Abdullah et al.

(10) Patent No.: US 12,781,445 B2
(45) Date of Patent: Nov. 3, 2026

(54) METHOD OF PAVING A ROAD

(71) Applicant: NAJRAN UNIVERSITY, Najran (SA)

(72) Inventors: Gamil M. S. Abdullah, Najran (SA); Ahmed Abd El Aal, Najran (SA); Mabkhoot Al Saiari, Najran (SA); Ahmed E. Radwan, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 430 days.

(21) Appl. No.: 18/597,527

(22) Filed: Mar. 6, 2024

(65) Prior Publication Data

US 2025/0283280 A1 Sep. 11, 2025

(51) Int. Cl.

| | |
|---|---|
| ***E01C 7/32*** | (2006.01) |
| ***C04B 14/04*** | (2006.01) |
| ***C04B 22/00*** | (2006.01) |
| ***C04B 28/04*** | (2006.01) |
| ***E01C 3/00*** | (2006.01) |
| *C04B 111/00* | (2006.01) |

(52) U.S. Cl.

CPC ................ *E01C 7/32* (2013.01); *C04B 14/04* (2013.01); *C04B 22/00863* (2021.05); *C04B 28/04* (2013.01); *E01C 3/003* (2013.01); *C04B 2111/0075* (2013.01); *C04B 2201/50* (2013.01)

(58) Field of Classification Search

CPC . E01C 3/003; E01C 7/32; C04B 14/04; C04B 28/04; C04B 2111/0075; C04B 2201/50

USPC ........................................ 404/17, 76, 90, 92

See application file for complete search history.

(56) References Cited

U.S. PATENT DOCUMENTS

| | | | | |
|---|---|---|---|---|
| 1,701,497 A * | 2/1929 | Heath | E01C 7/32 516/38 |
| 7,004,673 B2 | 2/2006 | Sapozhnikov | |
| 2009/0028650 A1* | 1/2009 | Delamore | C09D 133/26 405/302.6 |

(Continued)

FOREIGN PATENT DOCUMENTS

| | | |
|---|---|---|
| CN | 1562858 A | 1/2005 |
| CN | 115677309 A | 2/2023 |

(Continued)

OTHER PUBLICATIONS

Finozenok et al. ; Analysis of the Physical-Mechanical Concrete Properties When Concrete Waste Additives Are Used in the Mixtures ; Modern Building Materials, Structures and Techniques ; May 19-21, 2010 ; 7 Pages.

(Continued)

*Primary Examiner* — Raymond W Addie

(74) *Attorney, Agent, or Firm* — Oblon, McClelland, Maier & Neustadt, L.L.P.

(57) ABSTRACT

A method of paving a road including mixing soil beneath a location onto which the road will be paved with water, a coarse aggregate crushing waste (CACW) and cement in the form of a powder to form prepared soil and paving over the prepared soil to form a paved road. Furthermore, the prepared soil includes 5 to 20 wt. % of the CACW, and 0.1 to 5 wt. % of the cement, based on the total weight of the soil. Moreover, the prepared soil has a maximum dry density of at least 2.2 grams per cubic centimeter (g/cm$^3$) and an unconfined compression strength of at least 1100 kilopascals (kPa).

19 Claims, 13 Drawing Sheets

(56) References Cited

U.S. PATENT DOCUMENTS

2012/0207551 A1* 8/2012 Guilbault ............... C09K 17/36
523/132

FOREIGN PATENT DOCUMENTS

CN 115974505 A 4/2023
RU 2236504 C1 * 9/2004

OTHER PUBLICATIONS

Xiao et al. ; Laboratiry Validation of a Graduation Design Concept for Sustainable Applications of Unbound Granular Materials in Pavement Construction ; Journal of Constructions & Building Materials ; Oct. 2016 ; 38 Pages.

Herrador et al. ; Use of Recycled Construction and Demolition Waste Aggregate for Road Course Surfacing ; Journal of Transportation Engineering, vol. 138, Issue 2 ; Feb. 2012 ; Abstract Only ; 3 Pages.

* cited by examiner $y = -0.008x^2 + 0.1265x + 1.7339$
$R^2 = 0.9797$ $y = -0.0081x^2 + 0.1093x + 1.8114$
$R^2 = 0.9924$ $y = -0.0065x^2 + 0.0799x + 1.8726$
$R^2 = 0.9924$ $y = -0.0072x^2 + 0.1116x + 1.8192$
$R^2 = 0.9399$ $y = -0.0075x^2 + 0.1171x + 1.786$
$R^2 = 0.9417$ $y = -0.0007x^2 + 0.0188x + 2.1173$
$R^2 = 0.91$ $y = 0.1594x + 7.3986$
$R^2 = 0.9865$

| | | |
|---|---|---|
| C K | 4.18 | 6.72 |
| O K | 59.65 | 71.92 |
| Mg K | 5.53 | 4.39 |
| Al K | 4.74 | 3.39 |
| Si K | 10.96 | 7.53 |
| K K | 0.30 | 0.15 |
| Ca K | 4.42 | 2.13 |
| Ti K | 4.32 | 1.74 |
| Fe K | 5.90 | 2.04 |
| Totals | 100.00 | |

METHOD OF PAVING A ROAD

STATEMENT OF PRIOR DISCLOSURE BY INVENTOR

Aspects of the present disclosure are described in G. M. S. Abdullah, A. A. El Aal, M. Al Saiari, and A. E. Radwan, "Sustainable Impact of Coarse Aggregate Crushing Waste (CACW) in Decreasing Carbon Footprint and Enhancing Geotechnical Properties of Silty Sand Soil"; Applied Sciences; 2023; 13, 10930, incorporated herein by reference in its entirety.

STATEMENT OF ACKNOWLEDGEMENT

The support of the Deputyship for Research and Innovation-Ministry of Education, Kingdom of Saudi Arabia for this research through a grant (NU/DRP/SERC/12/47) under the Institutional Funding Committee at Najran University, Kingdom of Saudi Arabia is gratefully acknowledged.

BACKGROUND

Technical Field

The present disclosure is directed towards a method of preparing a roadbed, method of paving road, and more particularly, to a method of preparing a roadbed and/or paving a road using coarse aggregate crushing waste (CACW) and cement.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

In some parts of the world, the constructed infrastructure is in arid areas, mostly on brittle soils. These soils require chemical and/or mechanical stabilization techniques prior to construction. Lime and Portland cement are often used for their chemical stability, along with additional materials like coarse aggregate crushing waste (CACW). Due to the depletion of natural resources and the rising cost of accessible materials, it is necessary to investigate alternative sources of supply for construction projects, particularly for highways.

Because of the increased volume of waste materials in the environment in recent years, the recycling of industrial waste materials in ground improvement applications has become increasingly important. Furthermore, cement is widely utilized in civil engineering projects and is made from natural resources, such as chalk, limestone, and the like, that have been heated to extremely high temperatures, utilizing enormous amounts of natural energy. To curb this expenditure of enormous energy, industrial waste has been employed as an aggregate or cement in concrete manufacturing. Waste materials have also been employed in geotechnical engineering applications for soil improvement. However, substantial difficulty is still present in developing waste materials that may be employed as cement substitute materials in various civil engineering applications. CACW dust appears to be one of the potential waste products for substituting cement in many engineering projects. In addition, CACW is an environmentally benign and cost-effective material.

CACW is a by-product of the construction industry and is dumped in enormous quantities at crusher plants and quarry sites. Further, CACW is a non-plastic substance with good shear strength and zero carbon emissions. CACW, also known as stone dust, has a huge specific surface area due to its fine nature. Physical characteristics, chemical makeup, and mineralogy of stone dust differ depending on the parent rock type but are consistent with the quarry on-site. CACW is a commercial by-product that results from the first stage of crushing aggregates. These are fine aggregates made from particles smaller than 4 millimeters (mm) in diameter. A large quantity of CACW is produced each year and the waste needs to be handled appropriately.

As a result, it is necessary to evaluate an alternative option for using waste products to improve silty sand soil to meet the demands of both the economy and the environment. Although some research has been conducted to determine whether cement could stabilize poor soils worldwide, more studies are required to determine whether these industrial by-products could stabilize soil. In addition, there is a great need to reduce cement use through the efficient use of industrial waste products to lessen the greenhouse effect and environmental issues. Accordingly, an object of the present disclosure is to develop an efficient, sustainable, and environmentally friendly method of stabilizing soil using waste material generated from industries (CACW), thereby circumventing the drawbacks of the prior art.

SUMMARY

In an exemplary embodiment, a method of paving a road is described. The method includes mixing a soil beneath a location onto which the road will be paved with water, coarse aggregate crushing waste (CACW), and cement in the form of a powder to form prepared soil and further paving over the prepared soil to form a paved road. The prepared soil includes 5 to 20 wt. % of the CACW, and 0.1 to 5 wt. % of the cement, based on a total weight of the soil. Moreover, the prepared soil has a maximum dry density of at least 2.2 grams per cubic centimeter (g/cm$^3$) and an unconfined compression strength of at least 1100 kilopascals (kPa).

In some embodiments, the prepared soil includes 1 to 15 wt. % of the water based on a total weight of the soil.

In some embodiments, wherein the CACW includes 30-80 wt. % $SiO_2$, 10-30 wt. % $Al_2O_3$, 1-20 wt. %, CaO, 1-20 wt. % $Fe_2O_3$, 1-10 wt. % $K_2O$, 1-10 wt. % MgO, 0-5 wt. % $Na_2O$, 0-1 wt. % $P_2O_3$, and 0-5 wt. % $TiO_2$, based on a total weight of the CACW.

In some embodiments, the method includes pulverizing the soil prior to the mixing.

In some embodiments, particles of the soil have a grain size of less than 4 mm.

In some embodiments, particles of the CACW have a grain size of less than 4 mm.

In some embodiments, at least 80% of the particles of the CACW have a grain size of less than 1 mm.

In some embodiments, the soil is classified as silty sand (SM).

In some embodiments, particles of the CACW fill voids in the soil to form a continuous structure in the prepared soil.

In some embodiments, the prepared soil is homogeneous.

In some embodiments, the prepared soil includes 10 wt. % of the CACW, 2 wt. % of the cement, and 9 wt. % of the water based on a total weight of the soil.

In some embodiments, the prepared soil has an unconfined compression strength at least 3 times larger than the soil without the mixing.

In some embodiments, the prepared soil has an unconfined compression strength of 1100 to 1400 kPa.

In some embodiments, the prepared soil has a soaked California bearing ratio (CBR) of at least 30%.

In some embodiments, the prepared soil has an average weight loss after a slake test and a standard durability test of less than 12%.

In some embodiments, the method includes compressing the prepared soil prior to the paving.

In some embodiments, the soil, the water, the CACW, and the cement undergo pozzolanic reactions, thereby resulting in particles of the CACW accumulating over the soil in the prepared soil.

In another exemplary embodiment, mixing the soil, CACW, and the cement forms calcium silicate hydrate from calcium silicate phases of the cement, and the calcium silicate phases are combined with calcium in the CACW to stabilize the prepared soil.

In some embodiments, the paved road is a highway.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
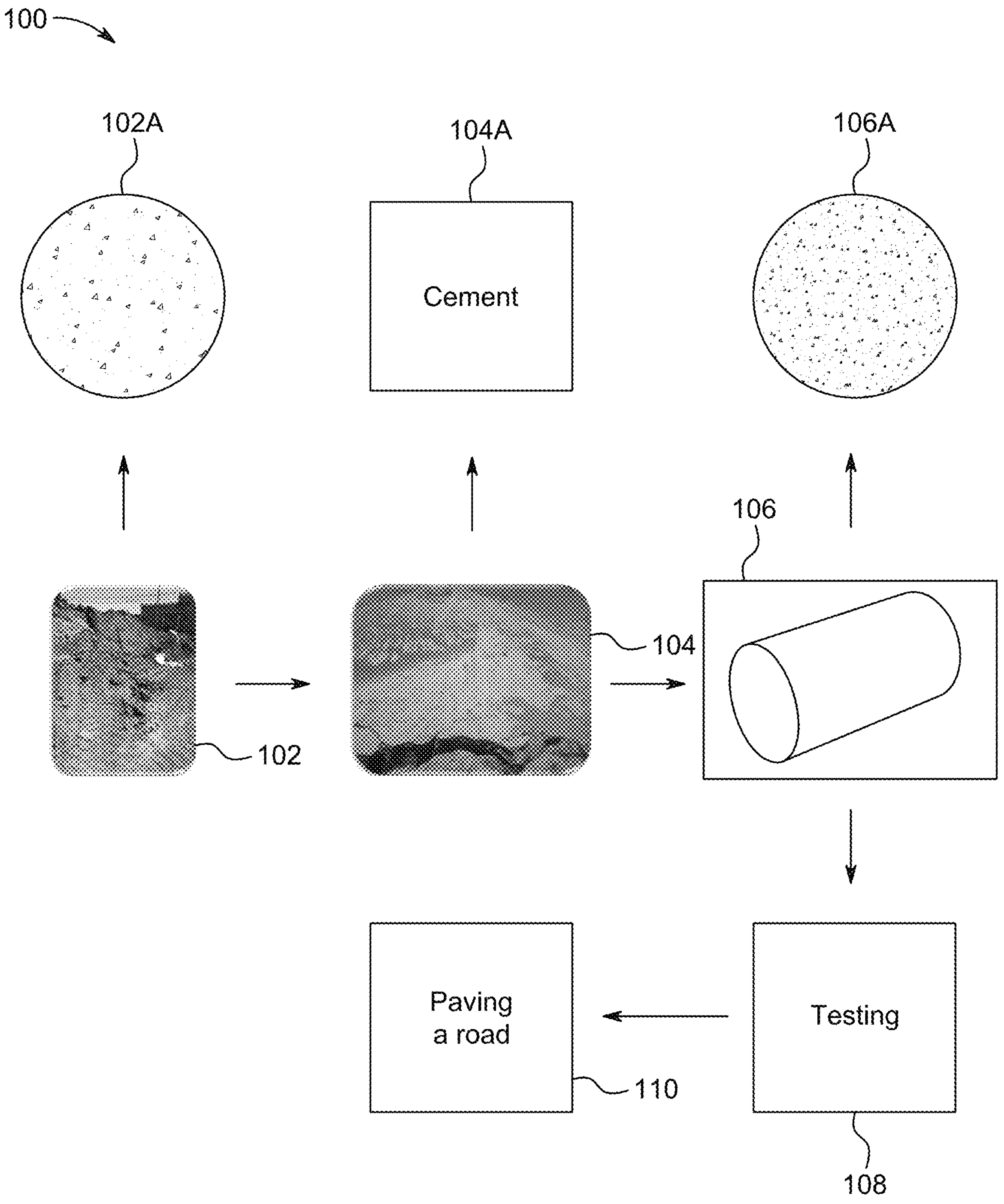
FIG. 1 is a schematic block diagram depicting a method of mixing coarse aggregate crushing waste (CACW) with silty sand (soil), according to certain embodiments.

In the drawings, reference numerals designate identical or corresponding parts throughout the several views. Further, as used herein, the words “a,” “an,” and the like generally carry a meaning of “one or more,” unless stated otherwise. Furthermore, the terms “approximately,” “approximate,” “about,” and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, ‘coarse aggregate crushing waste’ or ‘CACW’ is defined as a commercial by-product that results from the first stage of crushing aggregates. Coarse aggregates can be obtained by blasting quarries or crushing them by hand or crushers. Any material that is not large enough to be used as a coarse aggregate (stone dust) is then a waste product. Typically, CACW has a particle size smaller than 4 millimeters (mm) in diameter.

Aspects of the present disclosure are directed towards a method of preparing a roadbed and/or paving roads by mixing soil beneath a location onto which the road will be paved with water, coarse aggregate crushing waste (CACW), and cement. The method of the present disclosure provides one or more advantages over traditional techniques of paving roads on loose, structurally fragile soil. The advantages may include, but are not limited to, longer-lasting roads, increased load-bearing capacity of roads, resistance to flooding, higher temperature tolerance, and integrity of the paved material. In addition, the reinforced soil with the CACW demonstrates improved soil properties such as higher shear strength and load-bearing capacity. Further, the method of the present disclosure provides an alternative method of using a waste product, i.e., CACW, in an environmentally friendly manner.

Referring to FIG. 1, a schematic block diagram 100 depicting the method of paving a road is illustrated, in accordance with certain embodiments. In particular, the block diagram 100 depicts a plurality of steps involved in order to realize the method paving the road by stabilizing the soil onto which the road is paved with CACW, water, and cement. The block diagram 100 includes the soil 102. In some embodiments, the soil 102 is classified as silty sand (SM). The aforementioned soil classification agrees with unified soil classification system of the California department of transportation (CALTRANS). In accordance with the soil classification system, the silty sand has 50% or more of coarse fraction smaller than number 4 sieve size of the American society for testing and materials. In some embodiments, the soil 102 may be any other soil available at the location of paving of the road.

In some embodiments, the soil 102 has a plurality of voids 102A. In general, voids are inter-granular gaps or pockets of air existing naturally in the soil 102. The voids 102A are responsible for low load-bearing capacity of the soil 102, further, the voids make the soil 102 prone to flooding and caving, as water may fill in the voids 102A and may result in the caving of the soil 102. In some embodiments, the particles of the soil 102 have a grain size of less than 4 millimeters (mm), preferably less than 3.5 mm, 3.0 mm, 2.5 mm, 2.0 mm, 1.5 mm, 1.0 mm, 0.5 mm, or preferably 0.1 mm.

Furthermore, in some embodiments, the method includes pulverizing the soil 102 before mixing with other components (described below) included in the method of paving the road. In general, pulverization is the process of applying an external force to the soil of a certain size to reduce it into pieces that are smaller than the original size. The external force may refer to comminution, crushing, and/or grinding of the soil 102. In some embodiments, following the pulverizing, the particles of the soil 102 have a grain size of less than 4 mm, preferably less than 3.5 mm, 3.0 mm, 2.5 mm, 2.0 mm, 1.5 mm, 1.0 mm, 0.5 mm, or preferably 0.1 mm.

The block diagram 100 includes CACW 104. In general, CACW refers to coarse aggregate crushing waste, generated during the primary crushing of aggregates, such as, but not limited to, gravel, concrete, crushed stone, quarry waste. In some embodiments, the CACW 104 pertaining to the present disclosure includes 30 to 80 weight percentage (wt. %), preferably 35-75 wt. %, preferably 40-70 wt. %, preferably 45-65 wt. %, preferably 50-60 wt. %, preferably 55 wt. % of $SiO_2$, 10 to 30 wt. %, preferably 12-28 wt. %, m preferably 14-26 wt. %, preferably 16-28 wt. %, preferable 18-26 wt. %, preferably 20-24 wt. %, preferably 22 wt. % of $Al_2O_3$, 1 to 20 wt. %, preferably 3-18 wt. %, preferably 5-16 wt. %, preferably 7-14 wt. %, preferably 9-12 wt. %, preferably 10 wt. % of CaO, 1 to 20 wt. %, preferably 3-18 wt. %, preferably 5-16 wt. %, preferably 7-14 wt. %, preferably 9-12 wt. %, preferably 10 wt. % of $Fe_2O_3$, 1 to 10 wt. %, preferable 2-9 wt. %, preferably 3-8 wt. %, preferably 4-7 wt. %, preferably 5-6 wt. %, preferably 5.5 wt. % of $K_2O$, 1 to 10 wt. %, preferable 2-9 wt. %, preferably 3-8 wt. %, preferably 4-7 wt. %, preferably 5-6 wt. %, preferably 5.5 wt. % of MgO, 0 to 5 wt. %, preferably 1-4 wt. %, preferably 2-3 wt. %, preferably 2.7 wt. % of $Na_2O$, 0 to 1 wt. % $P_2O_3$, and 0 to 5 wt. %, preferably 1-4 wt. %, preferably 2-3 wt. %, preferably 2.7 wt. % of $TiO_2$, based on the total weight of the CACW 104.

In some embodiments, particles of the CACW 104 have a grain size of less than 4 mm, preferably less than 3.5 mm, 3.0 mm, 2.5 mm, 2.0 mm, 1.5 mm, 1.0 mm, 0.5 mm, or preferably 0.1 mm. Further, at least 80%, preferably 85%, preferably 90%, preferably 92%, preferably 95% of the particles of the CACW 104 have a grain size of less than 1 mm. However, in some embodiments, the grain size of the particles of the CACW 104 may vary depending upon the requirements of a particular use case or source of procurement of the CACW 104. The grain size of the particles of the CACW 104 has an impact on a plurality of properties of the CACW 104, including, but not limited to, permeability, porosity, compressibility, shear strength, and settling velocity.

Further, the block diagram 100 includes cement 104A and the CACW 104 is mixed with the cement 104A. The cement 104A may be one of, ordinary Portland cement, Portland pozzolana cement, rapid hardening cement, quick setting cement, sulfates resisting cement, blast furnace slag cement, high alumina cement, white cement, colored cement, air entertaining cement, expansive cement, and hydrographic cement. In some embodiments, Portland cement is preferred for the present disclosure. In a preferred embodiment, the amount of cement is limited due to environmental concerns, as discussed later.

In some embodiments, the aforementioned method of paving the road includes mixing the soil 102 beneath a location, e.g., the soil which is underlying the pavement is to be formed, onto which the road will be paved with water, the CACW 104, and cement 104A in the form of a powder to form prepared soil 106, e.g., a roadbed. The prepared soil 106 includes 5 to 20 wt. %, preferably 10-15 wt. % of CACW 104 and 0.1 to 5 wt. %, preferably 1-4 wt. %, or 2-3 wt. % of the cement 104A, based on the total weight of the soil 102. The prepared soil 106 includes 1 to 15 wt. %, preferably 2-14 wt. %, preferably 3-13 wt. %, preferably 4-12 wt. %, preferably 5-11 wt. %, preferably 6-10 wt. %, preferably 6.5-9.5 wt. %, preferably 9.2 wt. % of water based on the total weight of the soil 102. In particular, the prepared soil 106 includes 10 wt. % of CACW 104, 2 wt. % of cement 104A, and 9 wt. % of water based on the total weight of the soil 102.

In a preferred embodiment, the prepared soil 106 is made by the following steps. First, adding the CACW 104 in the dry silty sand soil 102. Second, mixing in the water such that a CACW-soil mix forms, preferably until a homogeneous mixture is formed. Third, adding the cement 104A powder to the CACW-soil mix, such that the cement powder reacts with the water and the CACW 104, thereby forming a stabilized or prepared soil 106.

In some embodiments, the soil 102, the water, the CACW 104, and the cement 104A undergo pozzolanic reactions, thereby resulting in the accumulation of the CACW 104 and cement 104A over particles of the soil 102 in the prepared soil 106. In other words, initially the CACW fills voids in the soil 102, and then in reaction with the cement 104A, a continuous stabilized structure in the prepared soil 106 is formed. In general, pozzolans are a broad class of siliceous and aluminous materials, including little or no cementitious value; however, if divided finely, they will react with calcium hydroxide ($Ca(OH)_2$) at ordinary temperature, in presence of water, to form compounds possessing cementitious properties. The pozzolanic reaction is a chemical reaction between the above-defined pozzolan and $Ca^{2+}$ of $Ca(OH)_2$, in the presence of water. The rate of the pozzolanic reaction is dependent on intrinsic characteristics of the pozzolan, such as specific surface area, chemical composition, and active phase content. Further, in some embodiments, mixing forms calcium silicate hydrate from calcium silicate phases of the cement 104A and the calcium silicate phases combined with the calcium in the CACW 104, stabilize the prepared soil 106. In other words, one or more fundamental stabilizing mechanisms are in operation to improve the stability of the prepared soil 106 under load. Cementitious properties of the cement 104A and calcium from the CACW 104 are at the forefront of the fundamental stabilizing mechanisms.

Further, the prepared soil 106 is homogenous. In some embodiments, the prepared soil 106 may be heterogeneous as well. As used herein, "homogenous" refers to similarity in structure or composition or both. In other words, the components of the prepared soil 106 are sufficiently mixed so that there are no large aggregations of any one component. For example, the CACW 104 is dispersed throughout the prepared soil 106. Furthermore, the particles of the CACW 104 fill the voids 102A of the soil 102 to form a continuous structure 106A in the prepared soil 106. As such, the continuous structure 106A of the prepared soil 106 provides the required additional stability to the prepared soil 106. In some embodiments, each component of the prepared soil interacts with the others. For example, the CACW 204 directly interacts with the soil 102 and the cement 104A, thereby forming a continuous connected structure. In some embodiments, the stabilized soil includes C, Mg, Si, Ca, K, and Fe. In some embodiments, the stabilized soil includes 1-10 wt. %, preferably 3-8 wt. %, or 4-6 wt. % C, 1-10 wt. %, preferably 3-8 wt. %, or 4-6 wt. % Mg, 1-12 wt. %, preferably 3-10 wt. %, or 4-7 wt. % Si, 1-10 wt. %, preferably 3-8 wt. %, or 4-6 wt. % Ca, 1-10 wt. %, preferably 3-8 wt. %, or 4-6 wt. % Fe, and 0.1-1.0 wt. %, preferably 0.3-0.6 wt. % K.

The prepared soil 106 has a maximum dry density (MDD) of at least 2.2 grams per cubic centimeter (g/cm$^3$), preferably 2.21 g/cm$^3$, 2.22 g/cm$^3$, 2.23 g/cm$^3$, 2.24 g/cm$^3$, 2.25 g/cm$^3$, or 2.26 g/cm$^3$. In general, the MDD refers to the density at which the maximum peak point of a soil compaction curve is obtained. Water content corresponding to the maximum peak point of the soil compaction curve is referred to as optimum water content (OWC), obtained at the MDD.

The block diagram 100 further includes testing 108. The testing 108 refers to a plurality of tests conducted on the prepared soil 106. Testing 108 includes, but is not limited to, the unconfined compression strength (UCS) test, see for example Test 37 of the Indian Railway Institute of Civil Engineering, California bearing ratio (CBR), see for example ASTM D1883 and AASHTO T 193, and slake test. In general, the UCS test determines the shear strength of a specimen. The UCS test is usually the fastest and most economical method of determining the shear strength of the specimen. In particular, the UCS test is conducted on the prepared soil 106 in order to determine the shear strength of the prepared soil 106. In some embodiments, the prepared soil 106 has a UCS at least 3, preferably 4 or 5 times larger than the soil 102 before mixing. In other words, the soil 102 without the CACW 104, the cement 104A, and the water has 3 times lower UCS and subsequently, shear strength than the prepared soil 106. In some embodiments, the prepared soil 106 has the UCS of 1100 to 1400 kPa, preferably 1200 kPa, or 1300 kPa. The improved UCS indicates that the CACW 104 fills the pore space of the soil 102A, which maintains the continuity of the grain-to-grain connections between the components of the prepared soil 106.

Further, CBR is the ratio expressed in the percentage of force per unit area required to penetrate a soil mass with a standard circular plunger of 50 mm diameter at a rate of 1.25 mm per minute to that required for corresponding penetration in a standard material. To simplify, the CBR test is used to determine the resistance to penetration of the prepared soil 106. In particular, the prepared soil 106 has a soaked CBR of at least 30%, preferably 40%, 50%, or 60%. Furthermore, the slake test demonstrates the stability of soil aggregates in water. When a piece of the prepared soil 106 is placed into water, the water is drawn into the prepared soil 106 and displaces air. If the large pores within the prepared soil 106 are stable, water may move into the prepared soil 106 without causing the aggregate to break apart or slake. In some embodiments, the prepared soil 106 has an average weight loss after the slake test and a standard durability test of less than 12%, preferably 10%, 8%, or 6%. In other words, after the slake and standard durability test, the prepared soil 106 lost about 12% of the weight of an original sample of the prepared soil 106.

The block diagram 100 includes paving a road 110. In particular, the paved road 110 is realized by paving over the prepared soil 106 to form the paved road 110. In general, a pavement is a part of a road that carries vehicular traffic and has a set of layers or material placed over a subgrade (soil). The pavement layers spread the load of the vehicles so that it does not exceed the strength capacity of the subgrade. In some embodiments, the method of paving the road includes compressing the prepared soil 106 prior to the paving. In other words, the prepared soil 106 is compressed in order to increase the shear strength, load load-bearing capacity, and resistance to penetration before paving the paved road 110.

In some embodiments, several possible techniques and methods may be employed to pave the paved road 110 over the prepared soil 106. In general, road construction includes the design, building, and maintenance of roads, highways, motorways, and other transportation infrastructure. In road engineering and construction, two major types of pavements are considered, rigid and flexible. When rigid pavements are constructed, a reinforced or unreinforced in-situ concrete slab is laid over the subgrade. Loads are supported by flexural strength of the pavement, which acts similar to a stiff plate, transferring the load over a wider area of subgrade. Concrete roads are a rigid road pavement type, with integrated joints in the concrete to control cracking. Further, flexible pavements have multiple layers, with road asphalt making up surface layers. With flexible pavements, wheel loads are transferred by particle-to-particle contact of an aggregate material (asphalt) through the unbound granular layers of the asphalt to the subgrade. The pavement is supported by and protects the subgrade below the pavement.

Steps involved in constructing the paved road 110 include adding CACW 104, cement 104A, and water to the soil 102 to form the prepared soil 106. Further, the prepared soil 106 is compacted and compressed using heavy machinery such as road rollers and the like. The prepared soil 106 is left to settle thereafter. In some cases, water irrigation may be carried out to soak the prepared soil 106 and eliminate any remaining voids, and to prevent caving of the prepared soil 106. Furthermore, bitumen and a crushed aggregate are chemically and physically combined together to form asphalt concrete, also referred to as tarmac. The bitumen refers to a black viscous mixture of hydrocarbons obtained naturally or as a residue from petroleum distillation. The asphalt concrete is laid over the prepared soil 106 via specialty road construction equipment and machinery. The road construction equipment may include a road roller, a motor grader, a wheel loader, an asphalt mixing plant, a crawler excavator, and the like. The road roller is used again to further compact the asphalt concrete and form a waterproof, low maintenance, and durable paved road 110. The paved road 110 may include multiple layers (defined from bottom to top, respectively), such as, but not limited to, a natural formation, subgrade, base course, surface course, and asphalt concrete. In some embodiments, the paved road 110 is a highway. However, in some embodiments, the paved road 110 may be a city road, a state highway, a national highway, and the like.

The preparation of the prepared soil 106 disclosed herein provides sufficient properties to support a paved road 110 on top of the prepared soil 106. While not wishing to be bound to a single theory, it is thought that the incorporation of the CACW 104 into the initial soil 102 causes a net reduction in pore volume, aids in developing dense mixes, and increases compressive strength. However, if the amount of the CACW 104 is more than that required to fill the pore space in the soil 102, the extra CACW 104 congregates on the grains in soil-binder mixtures, thereby reducing the amount of contact surface area required for chemical reactions. The extra amount of CACW also causes a more porous structure, which absorbs more water thereby increasing fine materials and causing a loss in strength.

EXAMPLES

The following examples demonstrate a method of paving a road using coarse aggregate crushing waste (CACW), cement, and water, in defined ratios, as described herein. The examples are provided solely for illustration and are not to be construed as limitations of the present disclosure, as many variations thereof are possible without departing from the spirit and scope of the present disclosure.

Example 1: Materials

Samples of silty sand soil were collected from a location in Najran City, Kingdom of Saudi Arabia. The methodology for collecting soil samples and conducting laboratory experiments for characterization included two stages. The first stage included collecting two bags, weighing 50 kg from a first site. This quantity was sufficient to construct three lab samples for each designed mix. In the second stage, the soil was first air-dried in the open air for seven days before being blended adequately for homogeneity. Further, the soil was pulverized with a plastic hammer and sieved with an American standard test sieve series (ASTM) sieve No. 4. Furthermore, the crushed soil was oven-dried for 48 hours at 70° C. to ensure moisture content elimination and then kept in a closed barrel until testing. The samples were then subjected to basic characterization, such as grain size distribution, specific gravity, and Atterberg's limits. The CACW stabilizer samples were collected from coarse aggregate crushing quarries and subjected to grain size analysis and specific gravity determination. The CACW samples were taken from the same quarries as the aggregates. Table 1 summarizes the chemical composition of the stabilizer.

TABLE 1

Chemical composition of CACW.

| Element | Composition range (%) |
|---|---|
| $SiO_2$ | 45-77 |
| $Al_2O_3$ | 15-20 |
| CaO | 3-15 |
| $Fe_2O_3$ | 6-16 |
| $K_2O$ | 3-5 |
| MgO | 1-4 |
| $Na_2O$ | 0-3 |
| $P_2O_3$ | 0-0.04 |
| $TiO_2$ | 0-2.33 |

Example 2: Soil Characterization

Figure 2:
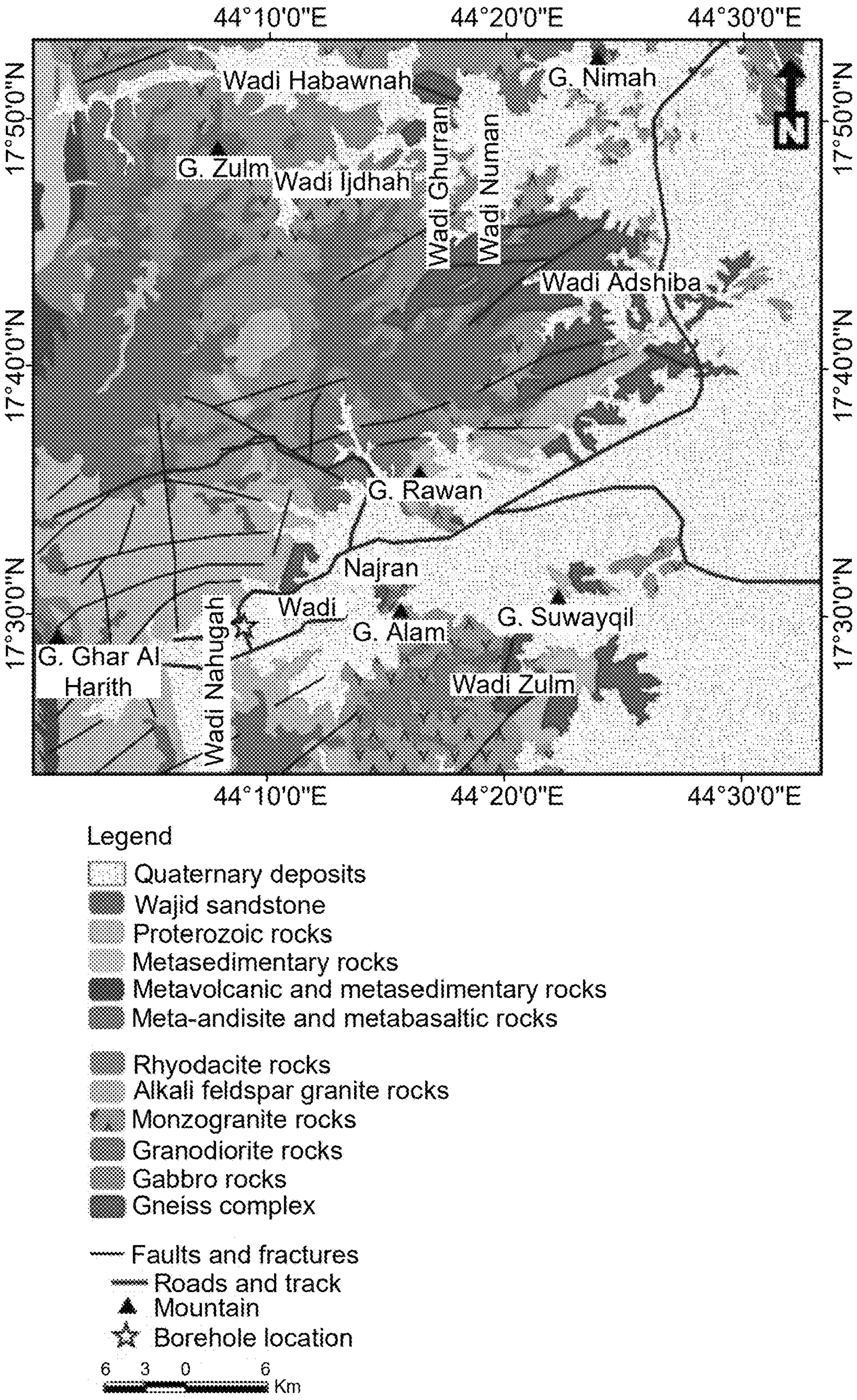
FIG. 2 is an image depicting a geological map for a study area of the soil, according to certain embodiments.

Primary characterization studies were carried out in accordance with ASTM standards to examine the engineering characteristics and mineralogical phases of the soil specimens. The locations from which the soils were obtained are provided in FIG. 2. The preliminary studies used Specific gravity, Atterberg limits, and grain size distribution to classify the soil (ASTM D854-23, ASTM D4318-17e1, ASTM D6913-04 (2009) e1, from ASTM.org, incorporated herein by reference). The mineralogical composition of the soil was further assessed using X-ray diffraction (XRD) and scanning electron microscopy (SEM) analysis. A pair of specimens were used in the experiment, and each specimen was put through ASTM sieve No. 4 before being used. The specific gravity was calculated using the average of both specimens. Liquid and plastic limits were evaluated on specimens passing ASTM sieve No. 4. All soil specimens were subjected to a grain size distribution test.

A mineralogical distribution of a material can anticipate how it may behave and react in different situations. The mineralogical investigation employed ten grams of the examined soil. The mineralogical compositions of the soil specimens were determined using SEM with field-electron (Tescan Lyra-3) and powder XRD techniques (Ultima IV). The secondary electron mode was used for SEM. Before the experiments, the samples were covered with gold (Au) to boost their conductivity. In addition, the elemental compositions of the soil were measured using an energy-dispersive X-ray (EDX) test and SEM for all samples. SEM was used to analyze the microstructural characteristics and the elemental composition of the carbonate samples. Soil specimens were ground into a powder using an agate mortar pestle for XRD examination. The specimens were then compressed into sample holders and inserted into the apparatus for examination. The crystals of the sample were found to be organized arbitrarily. A monochromatic (of a single wavelength) X-ray beam strikes a crystal. X-rays that hit the parallel surfaces that make up the crystal reflect at an angle because of this, as shown by Miller's indices. A series of reflections were seen, depending on the type of minerals in the soil. The crystals in the sample were arranged in a random pattern. By comparing the intensity and angle of incidence with those of standard minerals, it was possible to determine the type and number of minerals in the sample. The diffraction pattern was contrasted with normative diffraction patterns created by the Joint Committee of Powder Diffraction Standards (JCPDS) for various stages.

Example 3: Tests and Methods

The procedure used to design soil-CACW mixes with or without containing 2% cement is described hereinafter. A Hobart mixer with a capacity of 0.3 $m^3$ was filled with the necessary amount of soil. The percentage of CACW (5%, 10%, 15%, and 20%) by the dry weight of the soil sample was added to the mixer. In the case of adding cement, 2% of Portland cement was added to the dry weight of the soil sample. Finally, the percent of water content determined by the dry weight of the soil samples was added, and the mixer was operated continuously to obtain a homogeneous mix after about three minutes of mixing. To evaluate the designed mixes of silty sand soil with various percentages of CACW additive for road construction. Firstly, the mixes were subjected to a modified Proctor compaction test to obtain the optimum percentage of CACW and attain the maximum dry density. After that, the mixes were further examined using ultrasonic pulse velocity (UPV), unconfined compressive strength (UCS), and the California bearing ratio (CBR) test. Following the trend of the results of these tests, it was concluded that the best percentage of CACW enhances the geotechnical engineering properties of silty sand soil. Based on the results of previous tests, the passed mix continued to be subjected to the durability test. The tests, as mentioned earlier, provided insight into the long-term engineering performance of the mixes of CACW-silty sand soil in the pavement structure as a material in the subbase or subgrade layers. The following sections briefly describe the procedure of each test.

Example 4: Modified Proctor Compaction Test

The compaction test aims to identify compaction-related parameters, particularly the optimal moisture content (OMC) at which the soil reaches its maximum dry density. This test illustrates a link between dry density and water content for a particular compaction technique. Several compaction testing methodologies were employed, depending on the grain size distribution of the soil material. As seen in the example below, the study employed the modified Proctor compaction test. The procedure used to compact soil-CACW mixes containing 2% cement is described hereinafter. A Hobart mixer with a capacity of 0.3 $m^3$ was filled with the necessary amount of soil. The finished result was homogeneous after about three minutes of mixing, during which water was added. The modified Proctor compaction test's large mold was compacted at five levels. There were 25 blows per layer. Triple specimens were used and tested under each condition, and the average of the results was reported.

Example 5: Ultrasonic Pulse Velocity (UPV)

Measurements of UPV were made to assess the homogeneity and structural integrity of diverse compacted soils. The longitudinal wave velocities were calculated using the pulse transmission method, which entails connecting two piezoelectric sensors positioned on opposite faces of a sample with a diameter of 6 cm and a length of 12 cm. The velocity of the ultrasonic waves was determined using a standard meter (Matest, Italy). A viscoelastic gel was added to the sample's flat surface. The samples were positioned between the transmitter and receiver, and until a constant velocity was measured, the faces of the transducers were firmly pressed against the compacted dirt samples. The UPV was measured using the pulse transmission method using a Panametrics Pulser-Receiver (Model 5058 PR) and an Agilent DSO-X-2014A digital storage oscilloscope (100 MHz). Triple specimens were used and tested under each condition, and the average of the results was reported.

Example 6: UCS

The UCS test was performed to find the undrained shear strength and stress-strain features of undisturbed, remolded, and/or compacted specimens. This test was appropriate for soils with some cohesiveness as long as the sample was not allowed to expel water while being loaded. After eliminating the restriction provided by the mold walls for compacted samples, the soil sample must preserve its intrinsic strength. The preferred test for determining the strength of soils was the UCS test. This test was performed using an unconfined compression machine with a variable maximum load. The UCS test was carried out for 1, 3, 7, 14, 28, 90, and so on to track the influence of alterations in the mineralogical composition of stabilized products as time and environmental exposure increase. In the present disclosure, no treatment stabilizers were used; hence, the test was performed after 7 days for all soil samples. Samples utilized in the present disclosure, with a height-to-diameter (h/d) ratio of 2, were taken from a cylindrical mold with a height of 4 inches or 101.6 mm, and a diameter of 2 inches or 50.8 mm. The split-type mold was utilized to ensure that the samples extruded were as perfect as possible, as were the edges of the specimens. Triple specimens were used and tested under each condition, and the average of the results was reported.

Example 7: California Bearing Ration (CBR) Test

The CBR of the materials used in the base and sub-base courses has been widely used in structural design and assessment of pavements. As such, the test was adapted by engineers to assess materials for use in road construction and experimentally determine the soil strength under-regulated water content and density circumstances. The CBR test determined the force necessary for a standard-area plunger to pierce a soil sample. The pressure that must be applied to pierce a standard layer of crushed rock at the same depth was divided by the measured pressure. The ASTM standard outlines the CBR test for laboratory-prepared specimens. Soaked CBR tests were carried out in the present disclosure were in accordance with previous research (See: ASTM D1883-16; Standard Test Method for California Bearing Ratio (CBR) of Laboratory Compacted Soils. ASTM International: West Conshohocken, PA, USA, 2016). To imitate field situations in which the soil was flooded with water, which may come from either groundwater or rainwater permeating the layers. All soil specimens were subjected to soaking CBR tests, similar to UCS testing, to determine their CBR correlation with the P-wave results. Triple specimens were used and tested under each condition, and the average of the results were reported.

Example 8: Characterization of Soil and Stabilizer

CACW's external characteristics varied depending on the topography. CACW exhibited mineralogy and morphological changes when analyzed using SEM and XRD. Magma was the source of the intrusive igneous rock known as granite. Its main colors were white, pink, or gray. Minerals, including feldspar, quartz, mica, and amphibole, were the major components of these rocks. Depending on the region, the CACW produced by aggregate crushing plants and granite quarries had a different physical appearance. Plants for crushing aggregate produce CACW. The majority of fines were classified as fine aggregate with a particle size less than 4 mm in diameter and pass through the No. 200 screen. The chemical makeup of CACW was a significant material property essential to stability. Location, rock formation, and type of rock accessible affected the chemical makeup of the CACW.

Example 9: Grain Size Distribution of Soil and CACW

Figure 3:
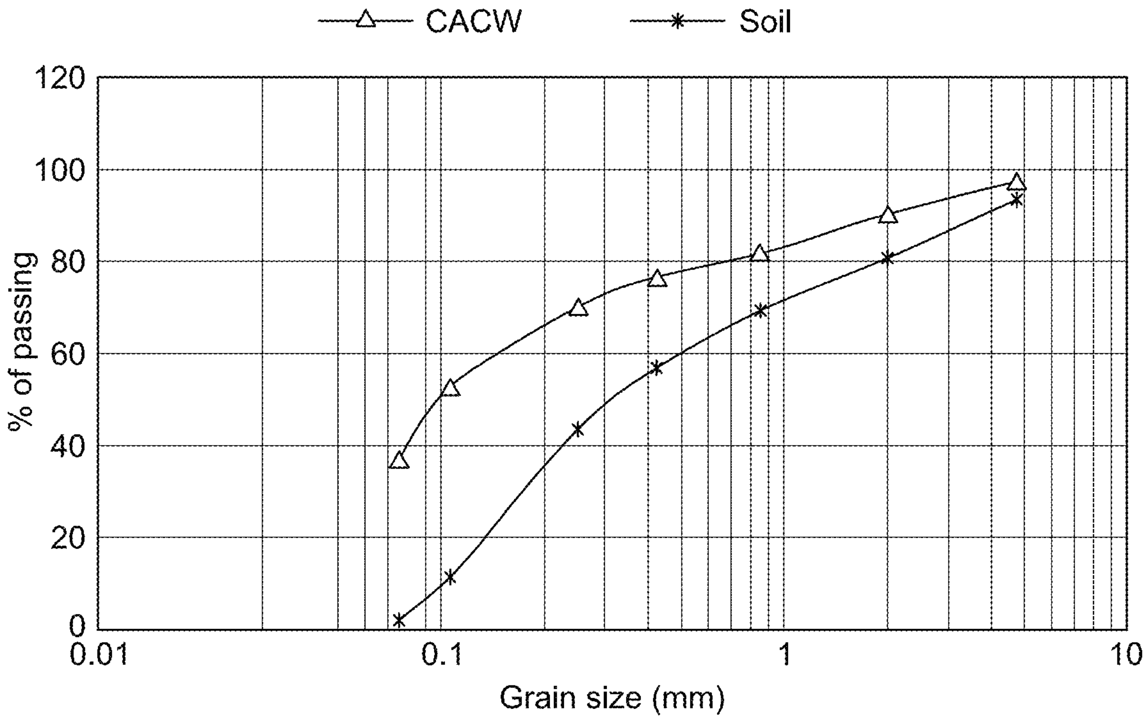
FIG. 3 depicts grain size distribution of the soil and the CACW, according to certain embodiments.

The fundamental geotechnical characterization of the soil was determined through a series of geotechnical tests, including specific gravity, Atterberg limits, and sieve analysis. According to the specific gravity test results, the soil had a value of 2.67. Contrarily, the findings of the Atterberg test indicate that the soil was non-plastic, which inhibits the rolling of the soil to a thread with a diameter of 3.18 mm and calculated the number of blows required to reach the liquid limit. The findings of the sieve analysis are shown in FIG. 3. As can be seen from FIG. 3, 2.3% of the soils pass through sieve No. 200, and these soils are categorized as silty sand "SM" according to USCS and A-3 as well as the AASHTO soil classification system.

Example 10: Modified Proctor Compaction Test Results

Figure 4:
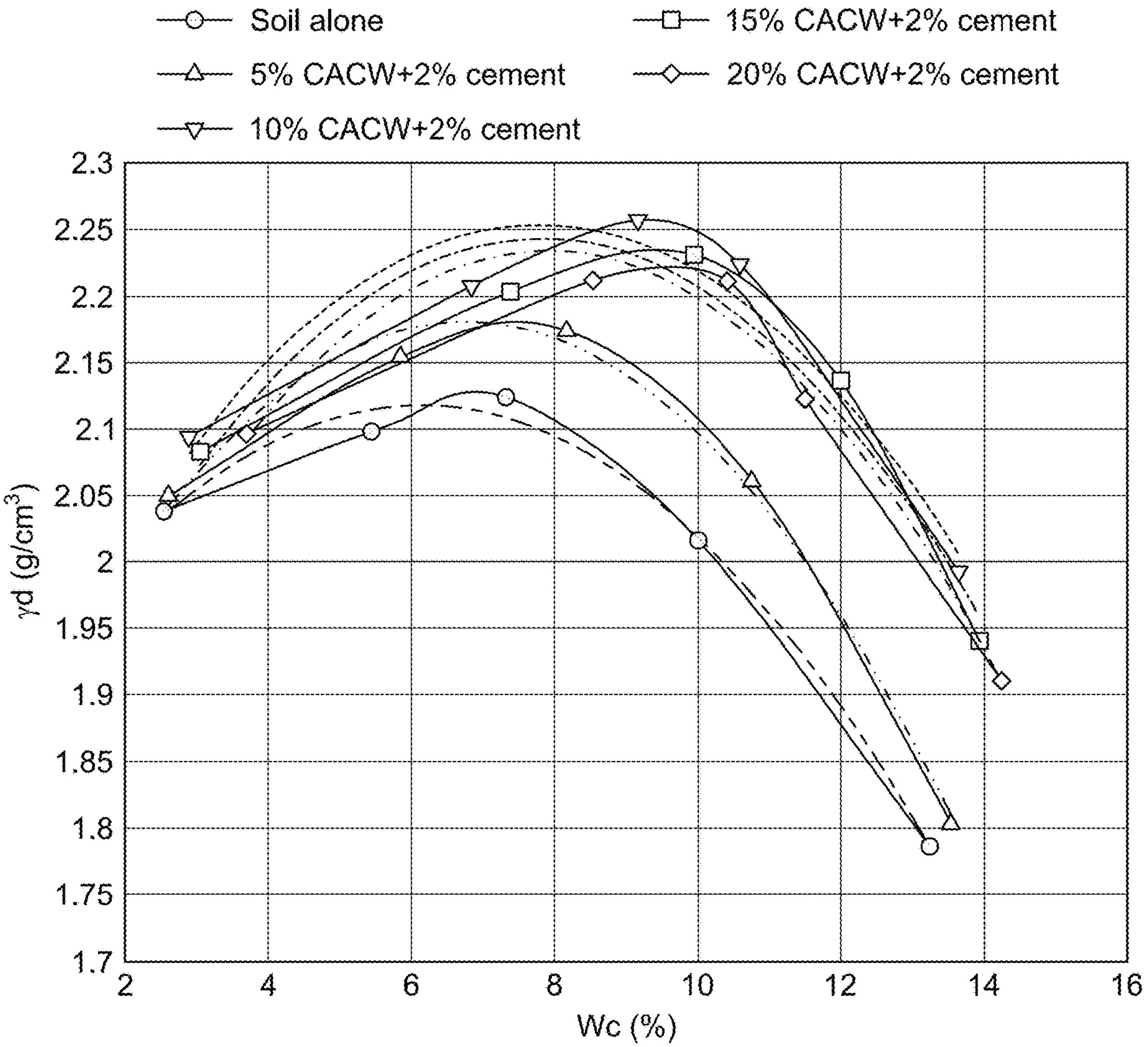
FIG. 4 is a graph depicting a relationship between dry density and moisture content of the soil, CACW, and 2% cement mixture, according to certain embodiments.

The maximum dry density (MDD) values of the CACW-soil mixes with the addition of 2% cement were in the range of 2.123 g/cm3 to 2.256 g/cm$^3$, as shown in FIG. 4. IT was observed that the effect of CACW on the maximum dry density was large. The maximum dry density increased from 2.123 g/cm3 for plain soil to 2.174 g/cm$^3$ and 2.256 g/cm$^3$ for the 5% and 10% addition of CACW, respectively. After that, the maximum dry density decreased to 2.231 g/cm3 and 2.211 g/cm$^3$ with the further addition of 15% and 20% of CACW, respectively. Adding 10% of CACW filled the soil voids and produced extra-dense samples with robust strength characteristics. In comparison, at 15% and 20% of CACW, a decrease in the maximum dry density of the mix was detected, as depicted in FIG. 4.

Figure 5:
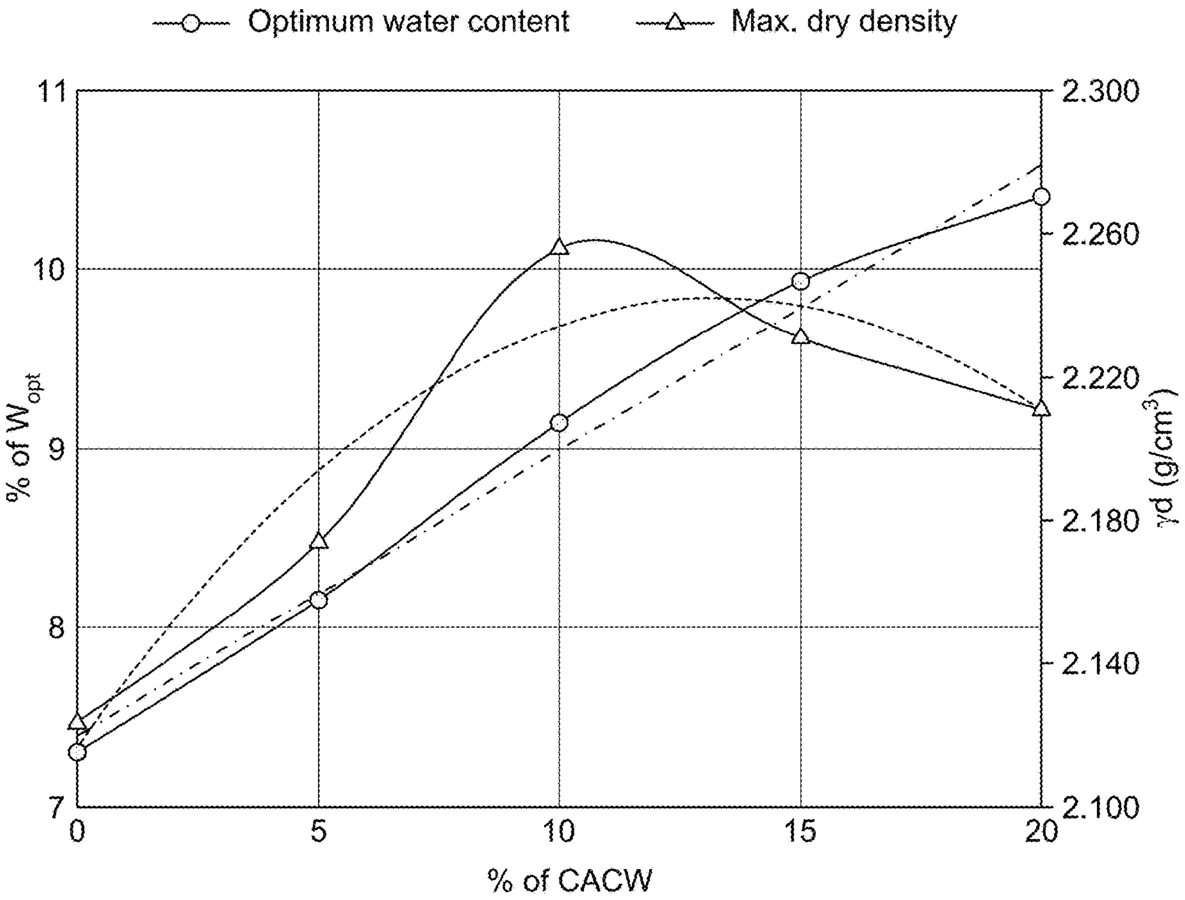
FIG. 5 is a graph depicting impact of addition of CACW on optimum moisture/water content and maximum dry density (MDD), according to certain embodiments.

The high concentration of CACW, which was more than that required to fill the pore space in the soil-CACW mixture, may be responsible for the reduction obtained with 15% and 20% CACW. The density of samples did not improve as the WMD proportion rose above 10%. Instead, a decrease in the sample density was found. The influence of CACW content with 2% cement addition on the OMC and the MDD is shown in FIG. 5. The data, as depicted in FIG. 5, illustrates that the increase in CACW percent was predominantly associated with an increase in the OMC. Due to the large surface area of CACW particles compared to soil, it raises the water demand and, as a result, increases the optimal moisture content. According to the dependencies shown in FIG. 4 and FIG. 5, mathematical models for calculating and predicting the output parameters under consideration, which may be obtained in the course of regression analysis, are given as follows:

'y' denotes the maximum dry density, and 'x' denotes water content in FIG. 4; hence, For soil alone:

$$y=-0.0065x2+0.0799x+1.8726\ R2=0.9924$$

For soil+5% CACW+2% cement:

$$y=-0.0081x2+0.1093x+1.8114\ R2=0.9924$$

For soil+10% CACW+2% cement:

$$y=-0.0072x2+0.1116x+1.8192\ R2=0.9399$$

For soil+15% CACW+2% cement:

$$y=-0.0075x2+0.1171x+1.786\ R2=0.9417$$

For soil+20% CACW+2% cement:

$$y=-0.008x2+0.1265x+1.7339\ R2=0.9797$$

Similarly, 'y' represents the MDD, and 'x" represents the CACW % in FIG. 5, $$y=-0.0007x2+0.0188x+2.1173\ R2=0.91$$

where 'y' represents the optimum water content of the mix and 'x' represents the CACW % in FIG. 5, $$y=0.1594x+7.3986\ R2=0.9865$$

Example 11: Ultrasonic Pulse Velocity (UPV)

Figure 6:
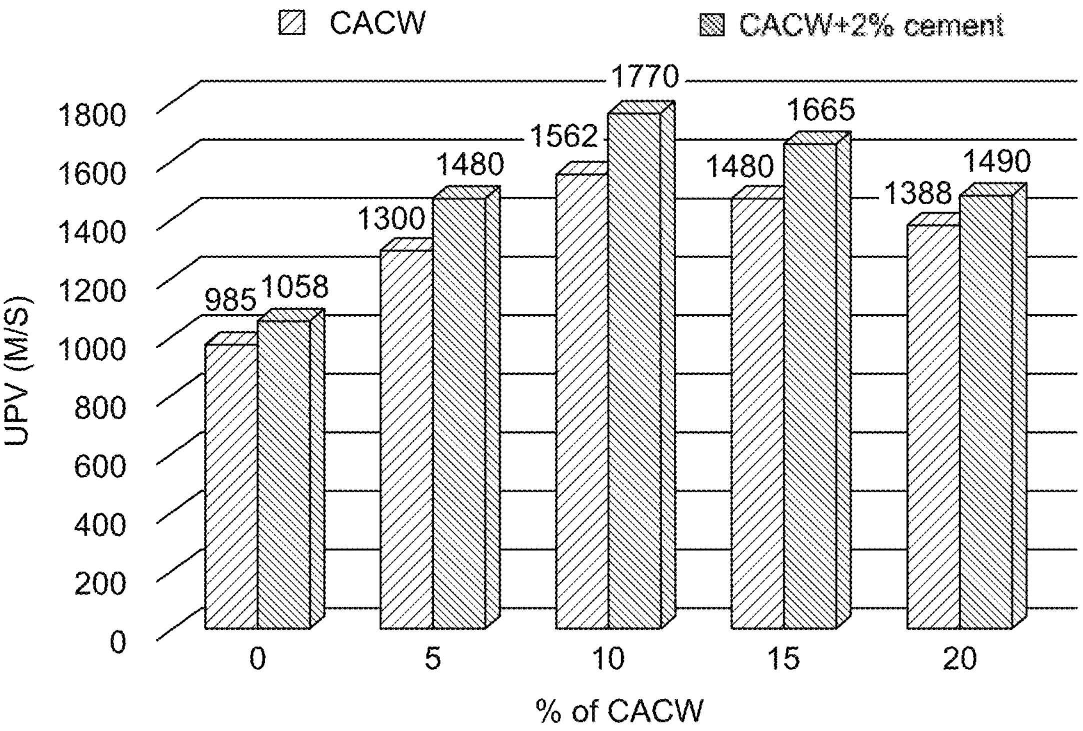
FIG. 6 is a graph depicting effect of addition of CACW at various concentration on ultrasonic pulse velocity (UPV), according to certain embodiments.

After 7 days of curing, UPV tests were conducted on four separate samples, including 0%, 5%, 10%, 15%, and 20% of CACW. The CACW influenced the improvement in UPV, as seen in FIG. 6. As such, the samples with 10% CACW had greater UPV values than those with other CACW fractions; however, specimens with 15% and 20% CACW slightly decreased UPV values. The sample with 10% CACW in the soil mixture performed better than the other mixes in UPV. The maximum UPV values were found at 10% of CACW due to the highest maximum dry density at the same percentage as indicated in the previous section. The improvement in UPV values was an indication of good densification in the soil-CACW mixture, particularly with 10% CACW and the soil-5% CACW-2% cement mixture. Greater UPV values are a sign that the specimen's structure has been homogenized, as this enables the applied waves to pass through the specimens more quickly and leads to greater UPV values. CACW, a finely graded granular material, has demonstrated its capability to operate as a good filler material by producing homogeneous mixtures and increasing particle bonding. FIG. 6 depicts that specimen with CACW greater than 10% had lower UPV values than those with 10% WMD. This demonstrated that 10% CACW is the fills the pore space in the specimen and maintains the continuity of the grain-to-grain connections.

As stated above, with a 10% CACW replacement, the maximum dry density of the specimen was increased, and the UPV of the mixtures was increased. This was owing to the more homogeneous and uniform structures of the mixture, which hastened the passage of ultrasonic waves in the mixtures, resulting in higher UPV values. The extra amount of CACW in the combination caused a more porous structure, which resulted in a reduction in the UPV of the specimens with a further increase in CACW replacement, as shown in FIG. 6. The same trend is observed with a higher value of ultrasonic pulse velocity, as shown in FIG. 6, when 2% cement is added to the mix.

Example 12: Results of CBR Tests

Figure 7:
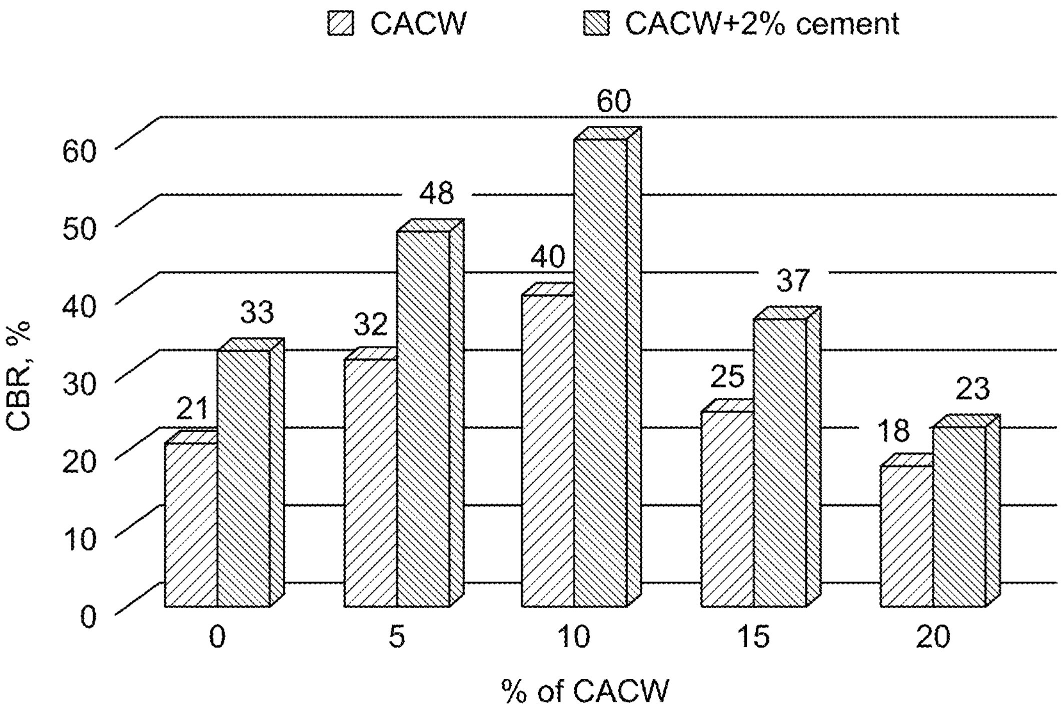
FIG. 7 is a graph depicting effect of addition of CACW on soaked California bearing ratio (CBR) value, according to certain embodiments.

CBR values for the materials used in a subgrade of pavement structure or subbase layer evaluate their effectiveness under traffic loading. Soaked CBR tests on specimens of silty sand soil treated with varying proportions of CACW were undertaken to imitate the poorest field circumstances. The experiment was conducted three times, and the average is shown in FIG. 7. As can be seen from FIG. 7, when 10% of CACW is added, the CBR value increases from 21% to 40%. When the percentage of CACW increased to 15%, the CBR value dropped from 40% to 25%. The value of the CBR has dropped by roughly 37.5%. Additionally, the decrease in CBR value, which went from 25% to 18% when CACW addition increased from 15% to 20%, is strongly connected with the rise in CACW percentage. This is because when CACW concentrations rise, more water is absorbed during the soaking phase, increasing fine materials, which causes a loss in strength and, consequently, lower CBR values. The same trend is observed with a higher value of CBR, as seen in FIG. 7 when 2% of cement was added to the mix. During the soaking period, the swelling was tracked and recorded, and the results showed that the soaked CBR specimens had no swelling. Therefore, adding 10% CACW with 2% cement to the soaked CBR value produced the highest value of around 60%. Further, the specimen may be utilized as a sub-base layer in constructing high traffic loading highways in compliance with standards. The process of filling and densification introduced by 10% CACW in the soil structure provides this strength, as can be seen in FIG. 7. The CACW powder acts as a void filler, forming a dense structure beneath the loading plunger of the CBR machine. Furthermore, as the CACW ratio is at a low value of 10%, water absorption is also low, enhancing the resistance to penetration of the soil-CACW mixture, resulting in a higher CBR rating of 40%, which reached 60% when 2% of cement was added to the mix.

Example 13: Results of UCS Tests

Figure 8:
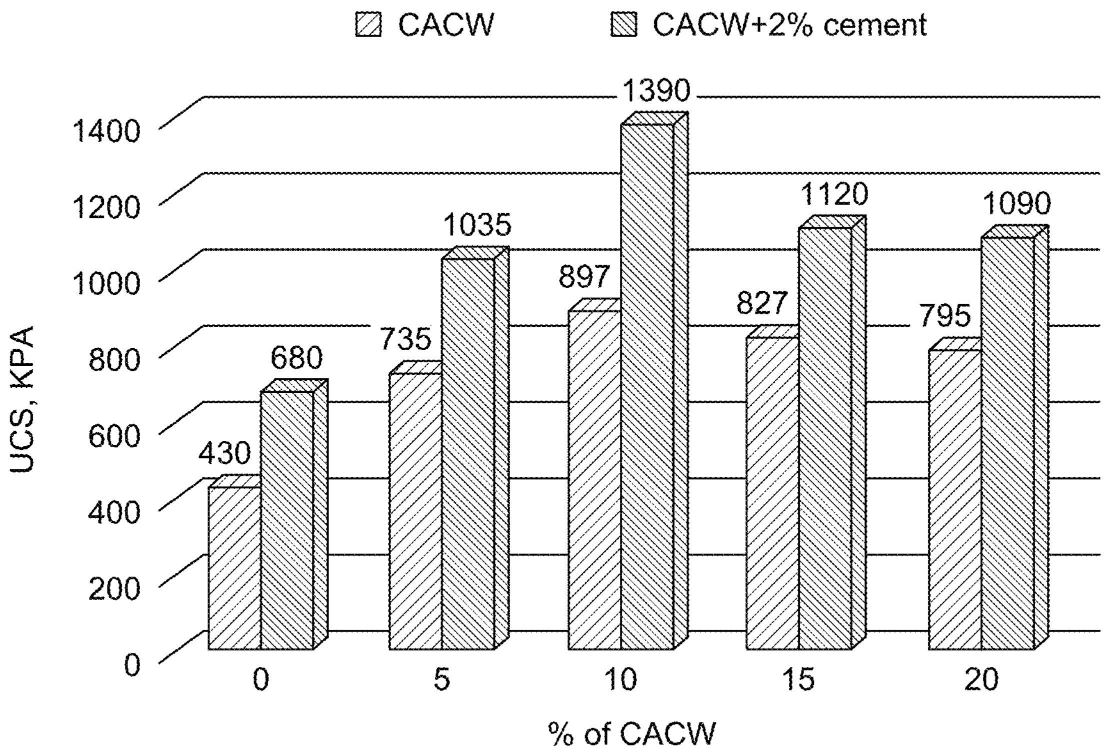
FIG. 8 is a graph depicting effect of addition of CACW on unconfined compression strength (UCS), according to certain embodiments.
Figure 9A:
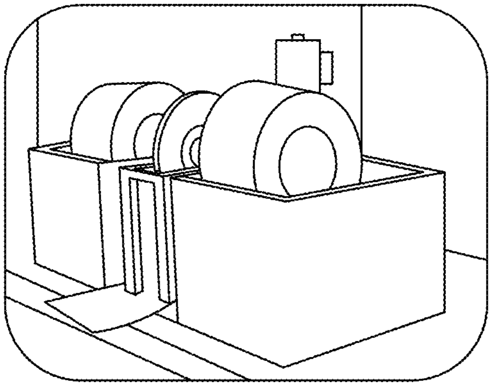
FIG. 9A is an image illustrating a perspective view of modified Slake test machine, according to certain embodiments.
Figure 9B:
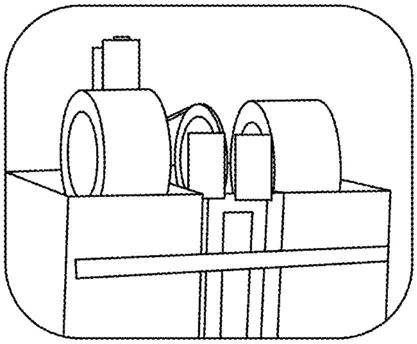
FIG. 9B is an image illustrating a side view of modified Slake test machine, according to certain embodiments.
Figure 9C:
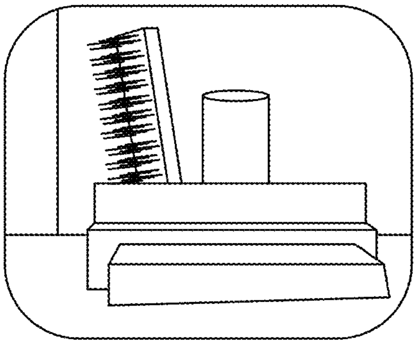
FIG. 9C is an image illustrating specimens with standard brush before testing, according to certain embodiments.
Figure 9D:
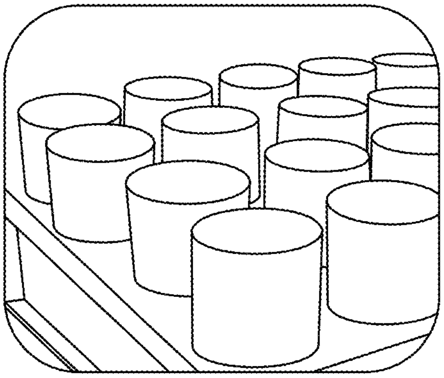
FIG. 9D is an image illustrating specimens after testing, according to certain embodiments.
Figure 10:
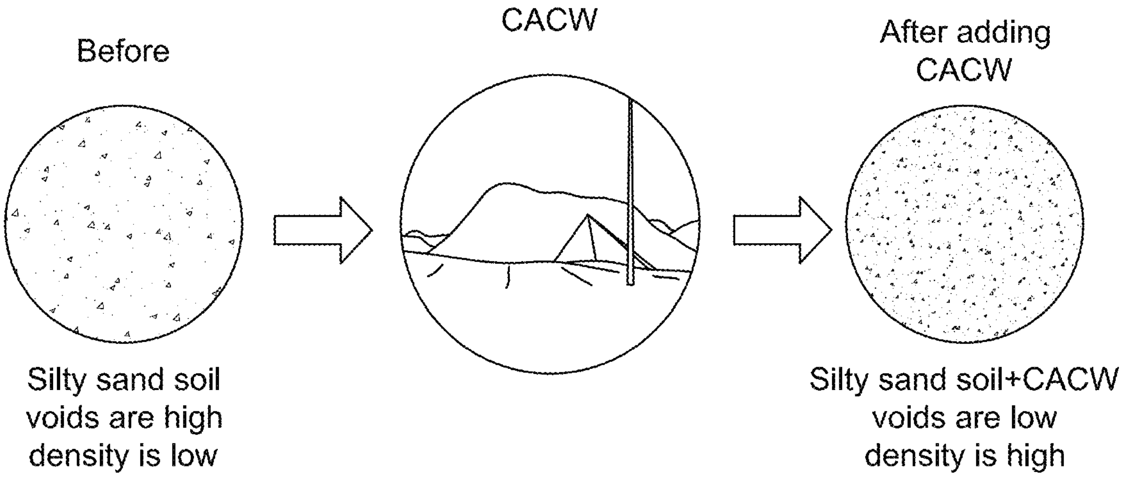
FIG. 10 is a schematic illustration depicting effect of CACW addition on voids and density of the soil, according to certain embodiments.

The specimens underwent an UCS test to ascertain their compressive strength after 7 days of curing. As depicted in FIG. 8, adding CACW to all mixes produced results that were better than the UCS value of the control specimen. With 10% CACW substitution, the greatest UCS value was attained. As can be seen from FIG. 8, compared to UCS values achieved with 10% CACW replacement, CACW replacement at a higher percentage than 10% led to lower UCS values. After a 7-day curing period, the UCS values of the specimens treated with 0%, 5%, 10%, 15%, and 20% CACW were 430-kilo Pascals (kPa), 735 kPa, 897 kPa, 827 kPa, and 795 kPa, respectively. The concentration of CACW required to improve the compressive strength of the combinations was 10%. This indicates that for completely filling the pore space and producing efficient soil-binder reactions 10% CACW with 2% cement is used. At a proportion above this cutoff, CACW completely fills all pore spaces, and extra CACW congregates on the grains in soil-binder mixtures. As a result, the amount of contact surface area required for chemical reactions was reduced. The same trend is observed when 2% cement is added to the soil-CACW mixes with higher values of UCS. The UCS values of the specimens treated with 0%, 5%, 10%, 15%, and 20% of CACW in addition to 2% of cement were 680 kPa, 1035 kPa, 1390 kPa, 1120 kPa, and 1090 kPa, respectively, after a 7-day curing period. FIG. 8 depicts the impact of various CACW percentages on UCS, and as can be observed from the graph, 10% CACW resulted in the greatest UPV and UCS values, as previously reported. When the CACW percentage was higher than 10%, the UPV and the UCS values decreased.

Example 14: Effect of CACW Addition on UCS

Soil mixes with 10% CACW and 2% Portland cement passed the ACI requirements for use in subgrade and sub-base layers in rigid pavement construction. Further, this mix of soil-10% CACW-2% cement was evaluated for durability criteria. The p-values and statistical results that support the trends described in FIG. 8 are shown in Table 2. Based on the statistical results presented, it is seen that the differences are statistically significant since the p-values are very small compared to the reference p-value of 0.05. This indicates there is substantial evidence against the null hypothesis.

TABLE 2 t-test, paired two samples for means of UCS results.

| Criteria | % ACW | 2% Cement + CACW |
|---|---|---|
| Mean | 736.8 | 1063 |
| Variance | 32829.2 | 64595 |
| Observations | 5 | 5 |
| Pearson correlation | 0.959028 | |
| Hypothesized mean difference | 0 | |
| df | 4 | |
| t Stat | −7.64721 | |
| P (T <= t) one-tail | 0.000786 | |
| t critical one-tail | 2.131847 | |
| P (T <= t) two-tail | 0.001571 | |
| t critical two-tail | 2.776445 | |

Example 15: Developed Research Methodology

Based on the research results shown in FIG. 6 to FIG. 8, a method of introducing CACW stabilized soil includes the following steps described hereinafter:

Introducing the CACW additive with the percentage of CACW of about 10% which shows the highest values of UPV, CBR, and UCS in the dry silty sand soil.

Adding the corresponding optimum water content of 9.2% and operating the mixer such that a CACW-soil mix forms.

Introducing the Portland cement 2% into the mixer and operating the mixer such that the cement-CACW stabilized soil forms.

Constructing specimens for durability tests and microscopic investigation.

Comparing the results with the rigid and flexible pavement layer structure requirements and planning further.

Example 16: Durability Tests (Wetting and Drying)

Temperature and moisture cause cycles of wetness and dryness or freezing and thawing. Stabilized soils must be robust and sustain stability and durability to withstand physical stresses under cyclical environmental loading and various exposure situations. These circumstances subject the stabilized soils to tensile and compressive stresses, which cause weight loss and/or volume change. The present disclosure depicts the durability of stabilized soils, which was evaluated using the proposed slake durability test and the standard. The slake test was initially utilized for rock testing but was recently adapted to handle stabilized soil specimens of particular sizes. Triple specimens were used and tested under each condition, and the average of the results was reported.

Example 17: Standard Durability Test

Silty sand soil samples stabilized with 10% CACW and 2% cement were created for durability tests. The mold was 4 inches (101.6 mm) in diameter and 4.6 inches (116.8 mm) in height for the soil samples. Each specimen underwent six stages of compression to achieve modified Proctor's maximum dry density. Fewer blows were required to attain the modified Proctor's maximum dry density. 39 strikes were determined to be the appropriate number after numerous tests were conducted for each layer. All samples were extruded from the molds after compaction. For each blend, four samples were created. These samples were chosen to indicate weight loss in two cases and volume change in two additional cases. The height and diameter of volume change samples were noted. All samples were cured for seven days at 23° C. and 100% relative humidity in the lab. After spending five hours at room temperature in a water tank, the samples were moved to an oven for 42 hours at 71° C. For stabilized soils, this procedure equals one cycle of wetting and drying. At the end of this cycle, the specimens designated for volume change were weighed and dimensioned using vernier calipers. The other two specimens were brushed with a standard brush with two strokes and a force of about 3 lb. To apply the 3 lb force, each sample was balanced on balance and brushed while being observed on the balance scale. Weighing the samples both before and after brushing was performed. The remaining 11 cycles were measured similarly, subjecting each specimen to 12 cycles. At the end of each cycle, the weight reduction and volume change of the respective specimens were noted. After 12 cycles, the samples were dried at 110° C. to a constant weight. Two equations were used to compute the volume decrease and weight reduction, as specified hereinafter.

Change of Volume (VC):

$$V_c(\%) = \left[\frac{V_i - V_f}{V_i}\right] \times 100$$

Weight Loss (Wl):

$$W_l(\%) = \left[\frac{W_i - W_f}{W_f}\right] \times 100$$

In which, VC is the change in sample volume after n cycles; Vi is the first volume of the sample in cm3 and Vf is the last volume of the sample in cm3, whereas Wl is the loss of weight of the sample after n cycles, Wi is initially computed oven-dry weight, and Wf is last adjusted oven-dry weight. The oven-dry weight was altered, and this weight may now be determined using the following equation, Oven-dry weight adjusted=C/D×100, in which C is the weight after drying in an oven at 230° F. (110° C.), D is the percent of water left on the sample plus 100.

Example 18: Durability Using Slake Test

This primary objective of the aforementioned test is to determine how durable rocks are. In general, a 500 g sample of rock particles is weighed in a drum with a 2 mm stainless steel screen. The drum has a diameter of 140 mm and a length of 100 mm. 20 revolutions per minute (rpm) are used to rotate the drum while it is half submerged in water. The amount of weight lost after 10 minutes of spinning indicates how durable the rock is. For the stabilized soil samples used in this investigation, this test was adopted and modified. The drum was resized to 152.4 mm or 6 inches long and 304.8 mm or 12 inches in diameter. The number of revolutions was altered to account for the change in dimensions so that the soil samples could go the same distance as the stone part in the first examination. Instead of 10 minutes, the revolution duration was cut to 4.6 minutes. A total trip distance of 88 m under the revised setup may be comparable to the original test. FIG. 8 depicts the setup for the slake durability test. Two additional samples were compacted using 10% CACW and 2% cement. These samples underwent the same wet and dry rounds as the materials tested using the durability test when evaluated using the modified slake durability apparatus. Before being weighed, the sample's surface was cleaned using a dry absorbent towel after slaking. It was possible to determine the weight reduction for each sample by comparing the weight before and after each cycle of laziness. After 12 cycles, the specimens were dried in the oven at 110° C. to determine the volume change and weight loss using the formulae mentioned above.

Example 19: Durability Test Results

The results of the two durability tests show that for the standard test methods of wetting, drying, and slake tests, the average weight losses of the evaluated mixes after 12 cycles were 8% and 10%, respectively. The findings demonstrate that the highest weight loss for the combinations did not go above the 14% maximum allowed weight loss for cement-soil mixtures. A comparison of the durability test results showed that, for all the evaluated samples, the amount of weight drop recorded by the slake durability testing was consistently more than the one obtained by ASTM standard test methods for wetting and drying. FIGS. 9A-9D shows the durability tests for specimens and used equipment. The underlying mechanism for the improved durability is attributed to the high-density mixtures formed using a 10% CACW additive, which plays a filler role in the mix voids and increases the interlocking of the soil grains, which in turn increases the shear strength of the CACW silty sand mixes. This result confirms the trend obtained through the previously mentioned tests such as, UCS, UPV, and CBR. Further, the microscopic analysis shows the dense mix formed at 10% CACW additive. The quantitative statistical analysis of the durability results is presented in Table 3. The p-values and statistical results support the differences between the two test methods. Based on the statistical results presented, it was seen that the differences are statistically significant since the p-values are very small compared to the reference p-value of 0.05. This indicates there is substantial evidence against the null hypothesis.

TABLE 3 t-test, paired two samples for means of durability test results.

| Criteria | Standard durability of soil + 10% CACW + 2% cement | Slake durability of soil + 10% CACW + 2% cement |
|---|---|---|
| Mean | 8.333333 | 10 |
| Variance | 1.166667 | 0.9 |
| Observations | 6 | 6 |
| Pearson correlation | 0.634335 | |
| Hypothesized mean difference | 0 | |
| Df | 5 | |
| t Stat | −4.66252 | |
| P (T <= t) one-tail | 0.00276 | |
| t critical one-tail | 2.015048 | |
| P (T <= t) two-tail | 0.00552 | |
| t critical two-tail | 2.570852 | |

Example 20: Microscopic Investigation

Figure 11A:
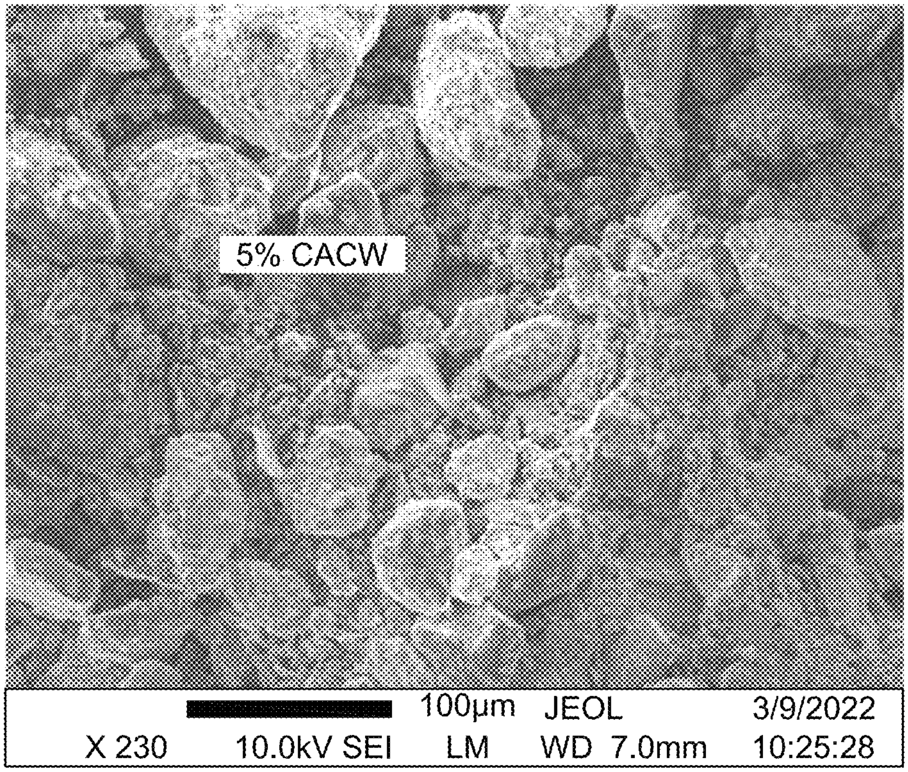
FIG. 11A is a scanning electron microscopy (SEM) image of the soil with 5 wt. % CACW, according to certain embodiments.
Figure 11B:
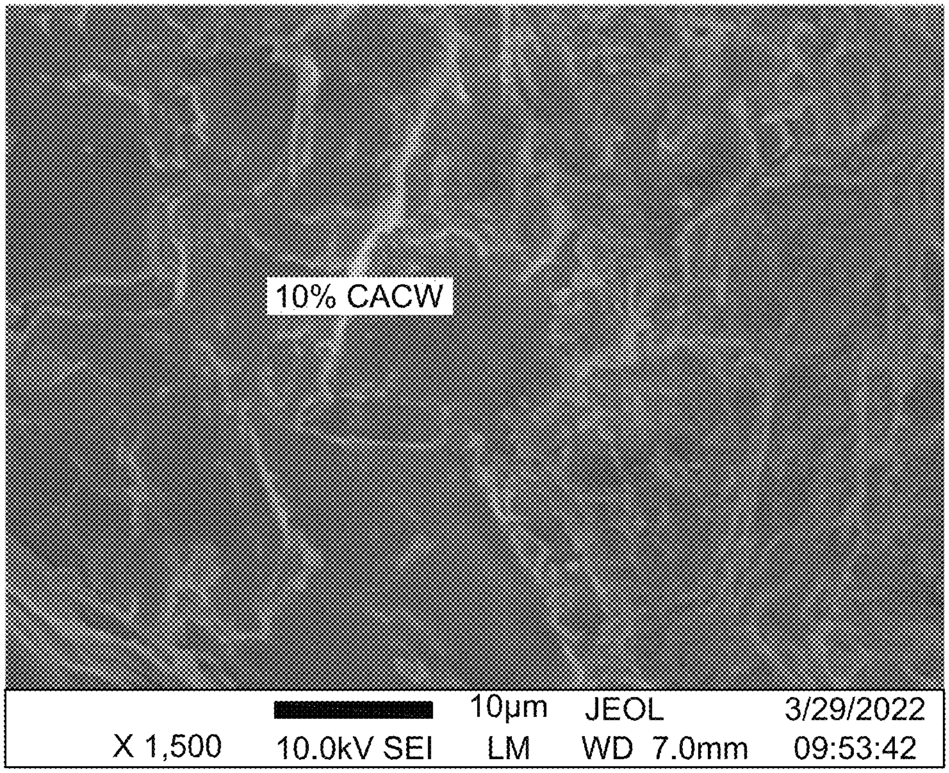
FIG. 11B is a SEM image of the soil with 10 wt. % CACW, according to certain embodiments.
Figure 11C:
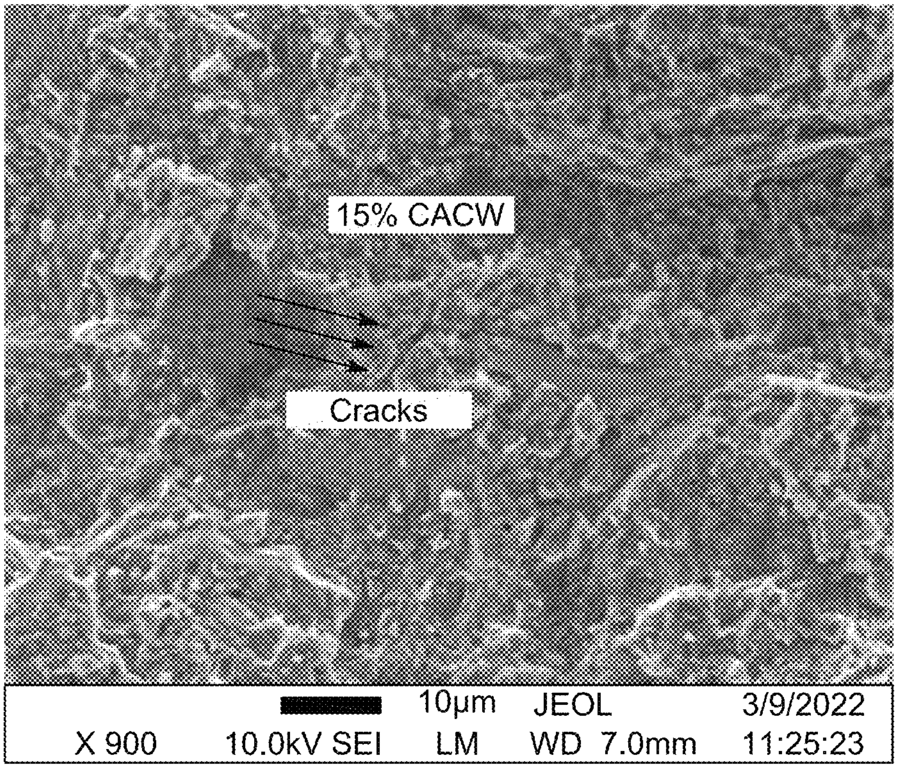
FIG. 11C is a SEM image of the soil with 15 wt. % CACW, according to certain embodiments.
Figure 11D:
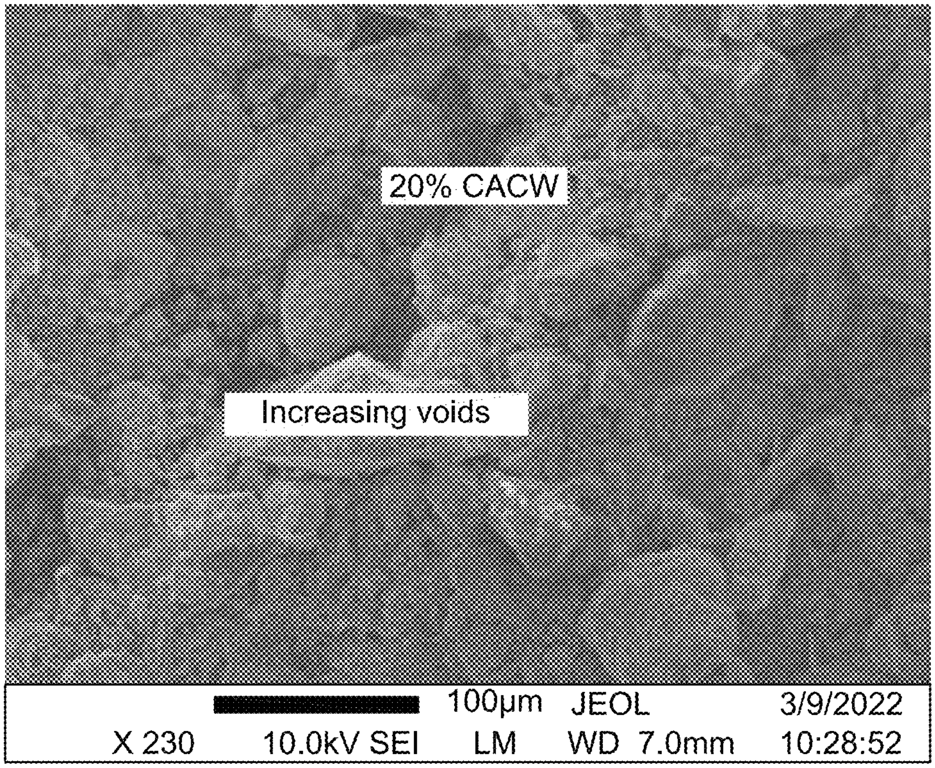
FIG. 11D is a SEM image of the soil with 20 wt. % CACW, according to certain embodiments.
Figure 11E:
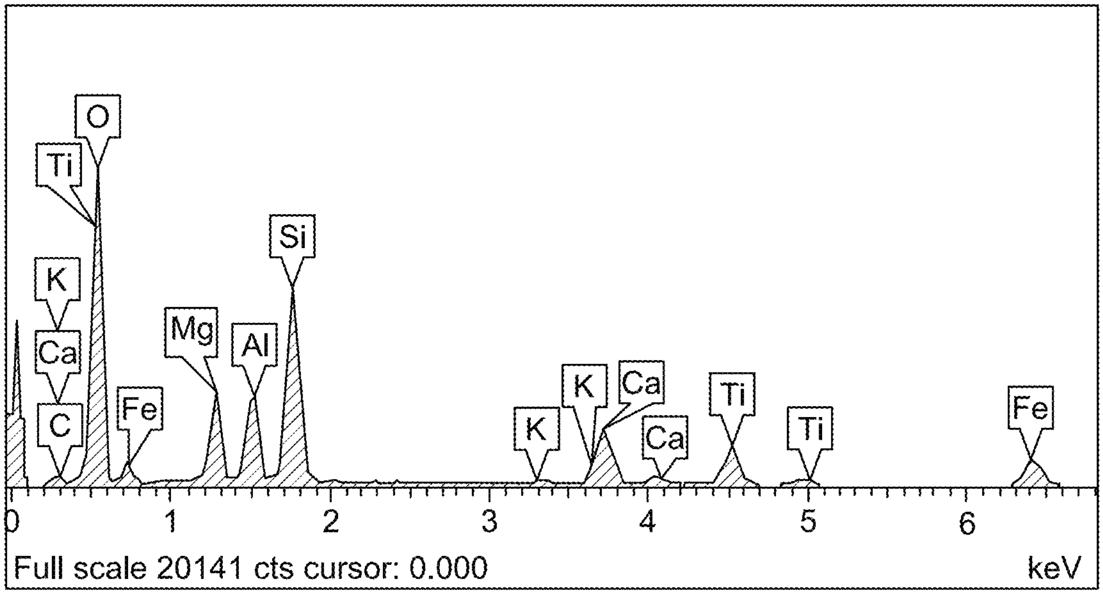
FIG. 11E is an energy-dispersive X-ray (EDX) spectrum of a composition of soil with CACW, according to certain embodiments.

By using an SEM Hitachi S 3700, the morphology of the silt soil, and admixtures was examined. As can be seen from FIG. 10 and FIGS. 11A-11E, silty sand, lime, and stone dust underwent pozzolanic reactions, resulting in stone dust and lime particles accumulating over the silty sand soil and generating various cementitious compounds. The SEM micrograph of silty sand soil stabilized with 10% CACW and 2% cement in FIG. 11B shows white fibrous cloth-like cementing gel, C—S—H, coating the sand and/or silt particles. This improved the UCS of the stabilized silty sand soil. The system contains discrete sand and/or silt grains. Both direct interactions between particles and connectors are visible. The stabilized soil matrix had weight proportions of 4.18%, 5.53%, 10.96%, 4.42%, 0.30%, and 5.90% for C, Mg, Si, Ca, K, and Fe, respectively, according to EDX results (FIG. 11E).

Various fundamental stabilizing mechanisms are in operation to keep soil stable. The direct cementitious effects of Portland cement strengthen sandy materials since they are less plastic and volumetrically unstable as measured by their bearing capacity, unconfined compressive strength, and the like. The primary reaction occurs when the C3S and C2S in cement combine with water to form calcium silicate hydrate. Cementation is considerably enhanced by the concentration of available alkali in solution. By combining soil, cement, and water, cement stabilizes soils. The size has been reduced. The resultant mixture is a building material that is heat, water, and frost resistant.

The two most important phases for stabilizing soil are the calcium silicate phases (C3S and C2S). These two phases aid in forming calcium silicate hydrate, or C—S—H, which acts as a binder in the soil matrix. Calcium hydroxide stabilizes the clayey soil by making calcium available for cation exchange, flocculation, and agglomeration when those phases are hydrated.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of paving a road, comprising:

mixing a soil beneath a location onto which the road will be paved with water, a coarse aggregate crushing waste (CACW) and cement in the form of a powder to form prepared soil; and paving over the prepared soil to form a paved road, wherein the prepared soil comprises 5 to 20 wt. % of the CACW, and 0.1 to 5 wt. % of the cement, based on a total weight of the soil, and wherein the prepared soil has a maximum dry density of at least 2.2 grams per cubic centimeter ($g/cm^3$) and an unconfined compression strength of at least 1100 kilopascals (kPa).

2. The method of claim 1, wherein the prepared soil comprises 1 to 15 wt. % of the water based on a total weight of the soil.

3. The method of claim 1, wherein the CACW comprises 30-80 wt. % $SiO_2$, 10-30 wt. % $Al_2O_3$, 1-20 wt. %, CaO, 1-20 wt. % $Fe_2O_3$, 1-10 wt. % $K_2O$, 1-10 wt. % MgO, 0-5 wt. % $Na_2O$, 0-1 wt. % $P_2O_3$, and 0-5 wt. % $TiO_2$, based on a total weight of the CACW.

4. The method of claim 1, further comprising pulverizing the soil prior to the mixing.

5. The method of claim 4, wherein particles of the soil have a grain size of less than 4 mm.

6. The method of claim 1, wherein particles of the CACW have a grain size of less than 4 mm.

7. The method of claim 6, wherein at least 80% of the particles of the CACW have a grain size of less than 1 mm.

8. The method of claim 1, wherein the soil is classified as silty sand (SM).

9. The method of claim 1, wherein particles of the CACW fill voids in the soil to form a continuous structure in the prepared soil.

10. The method of claim 9, wherein the prepared soil is homogeneous.

11. The method of claim 1, wherein the prepared soil comprises 10 wt. % of the CACW, 2 wt. % of the cement, and 9 wt. % of the water based on a total weight of the soil.

12. The method of claim 1, wherein the prepared soil has an unconfined compression strength at least 3 times larger than the soil without mixing.

13. The method of claim 1, wherein the prepared soil has an unconfined compression strength of 1100 to 1400 kPa.

14. The method of claim 1, wherein the prepared soil has a soaked California bearing ratio (CBR) of at least 30%.

15. The method of claim 1, wherein the prepared soil has an average weight loss after a slake test and a standard durability test of less than 12%.

16. The method of claim 1, further comprising compressing the prepared soil prior to the paving.

17. The method of claim 1, wherein the soil, the water, the CACW, and the cement undergo pozzolanic reactions, thereby resulting in particles of the CACW accumulating over the prepared soil.

18. The method of claim 17, wherein mixing forms calcium silicate hydrate from calcium silicate phases of the cement, and wherein the calcium silicate phases combined with calcium in the CACW, stabilize the prepared soil.

19. The method of claim 1, wherein the paved road is a highway.

* * * * *